US006859355B2

(12) United States Patent
Chuang et al.

(10) Patent No.: US 6,859,355 B2
(45) Date of Patent: Feb. 22, 2005

(54) ELECTRONIC APPARATUS WITH REPLACEABLE TOUCH CONTROL MODULE

(75) Inventors: Wei-Pin Chuang, Taipei (TW); Wu-Yung Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 100 days.

(21) Appl. No.: 10/331,482

(22) Filed: Dec. 31, 2002

(65) Prior Publication Data

US 2004/0100449 A1 May 27, 2004

(30) Foreign Application Priority Data

Nov. 22, 2002 (TW) ........................................ 91218916 U

(51) Int. Cl.⁷ .................................................. G06F 1/16
(52) U.S. Cl. ........................ 361/680; 361/683; 361/686; 345/158; 345/168
(58) Field of Search .................... 361/680, 682–687, 361/725, 727; 312/223.6, 330.1; 248/118.1, 442.2, 918, 456, 461, 677, 205.3; 174/DIG. 9; 178/18.01; 345/157, 158, 156, 173, 905, 169, 168; 200/305

(56) References Cited

U.S. PATENT DOCUMENTS

| | | | | | |
|---|---|---|---|---|---|
| 5,339,213 A | * | 8/1994 | O'Callaghan | ................ | 361/683 |
| 5,793,355 A | * | 8/1998 | Youens | ........................ | 345/157 |
| 6,096,984 A | * | 8/2000 | Howell et al. | ........... | 178/18.01 |
| 6,163,326 A | * | 12/2000 | Klein et al. | .................. | 345/156 |
| 6,177,924 B1 | * | 1/2001 | Bae | ............................. | 345/157 |
| 6,219,038 B1 | * | 4/2001 | Cho | ............................ | 345/173 |
| 6,424,335 B1 | * | 7/2002 | Kim et al. | ................... | 345/158 |
| 6,480,373 B1 | * | 11/2002 | Landry et al. | .............. | 361/680 |
| 6,670,950 B1 | * | 12/2003 | Chin et al. | ................... | 345/173 |
| 2002/0006031 A1 | * | 1/2002 | Liu | ............................. | 361/756 |

* cited by examiner

*Primary Examiner*—Michael Datskovsky
(74) *Attorney, Agent, or Firm*—Bacon & Thomas PLLC

(57) ABSTRACT

An electronic apparatus includes a host module and a touch control module. The host module includes a housing and a host circuit received in the housing. The touch control module includes a face panel and a touch control pad. The face panel is mounted removably on the housing, and has an outer side face, an inner side face, and an aperture formed through the outer and inner side faces. The touch control pad is used for cursor control, is mounted on the inner side face, is accessible through the aperture, and is coupled electrically and separably to the host circuit.

12 Claims, 7 Drawing Sheets

ELECTRONIC APPARATUS WITH REPLACEABLE TOUCH CONTROL MODULE

CROSS-REFERENCE TO RELATED APPLICATION

This application claims priority of Taiwanese application no. 091218916, filed on Nov. 22, 2002.

BACKGROUND OF THE INVENTION

1. Field of the Invention

The invention relates to an electronic apparatus, more particularly to an electronic apparatus with a replaceable touch control module.

2. Description of the Related Art

Sales of electronic apparatus are very competitive nowadays. Therefore, for an electronic apparatus manufacturer, the ability to remain competitive not only resides in keeping manufacturing costs low, but also in keeping after sales maintenance costs to a minimum. To lower maintenance costs, labor and time involved must be kept low.

On the other hand, to promote an electronic apparatus, appearance has become an important factor nowadays. For portable electronic apparatus, such as notebook computers, an increasing number of consumers demand a personalized appearance for the same.

As shown in FIG. 1, a conventional notebook computer 4 is constructed using components that are compactly integrated together. The housing of the notebook computer 4 is integrally formed with a face panel 41. A touch control pad 42 and a plurality of key caps 43 are secured to the face panel 41. Therefore, when damaged, the touch control pad 42 and the key caps 43 cannot be removed for replacement by consumers. A maintenance engineer even has to dismantle the entire housing when fixing the damaged parts. In view of this, a lot of labor and time are required for maintenance of the aforesaid parts. Moreover, the integrated design of the housing, the face panel 41, the touch control pad 42, and the key caps 43 does not meet the user's demand for personalized appearance.

SUMMARY OF THE INVENTION

Therefore, the main object of the present invention is to provide an electronic apparatus with a replaceable touch control module that can overcome the aforesaid drawbacks associated with the prior art.

Accordingly, the electronic apparatus of the present invention comprises a host module and a touch control module. The host module includes a housing and a host circuit received in the housing. The touch control module includes a face panel and a touch control pad for cursor control. The face panel is mounted removably on the housing, and has an outer side face, an inner side face, and an aperture formed through the outer and inner side faces. The touch control pad is mounted on the inner side face, is accessible through the aperture, and is coupled electrically and separably to the host circuit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
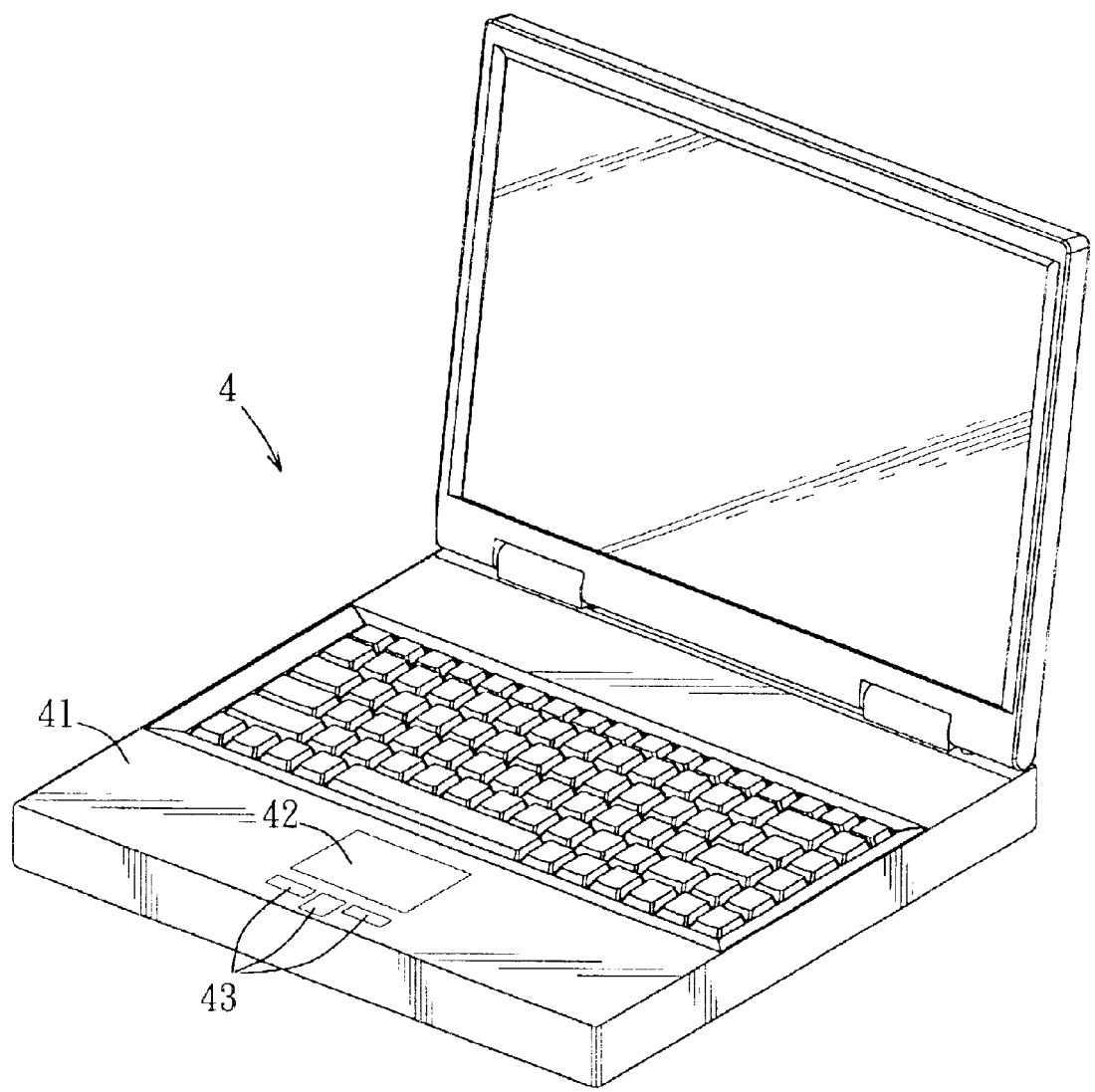
FIG. 1 is a perspective view of a conventional electronic apparatus.
Figure 2:
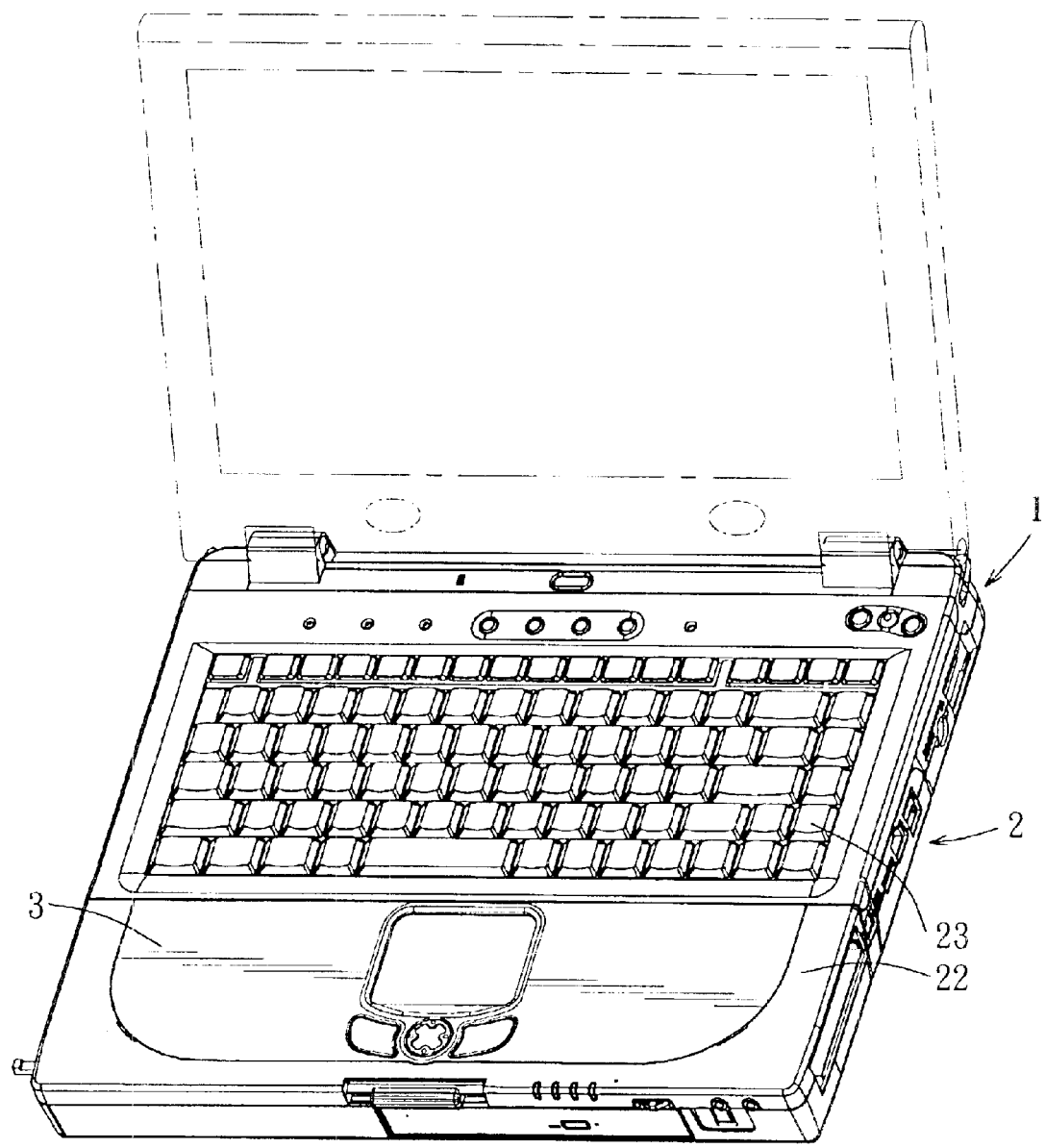
FIG. 2 is an assembled perspective view of the preferred embodiment of an electronic apparatus according to the present invention.
Figure 3:
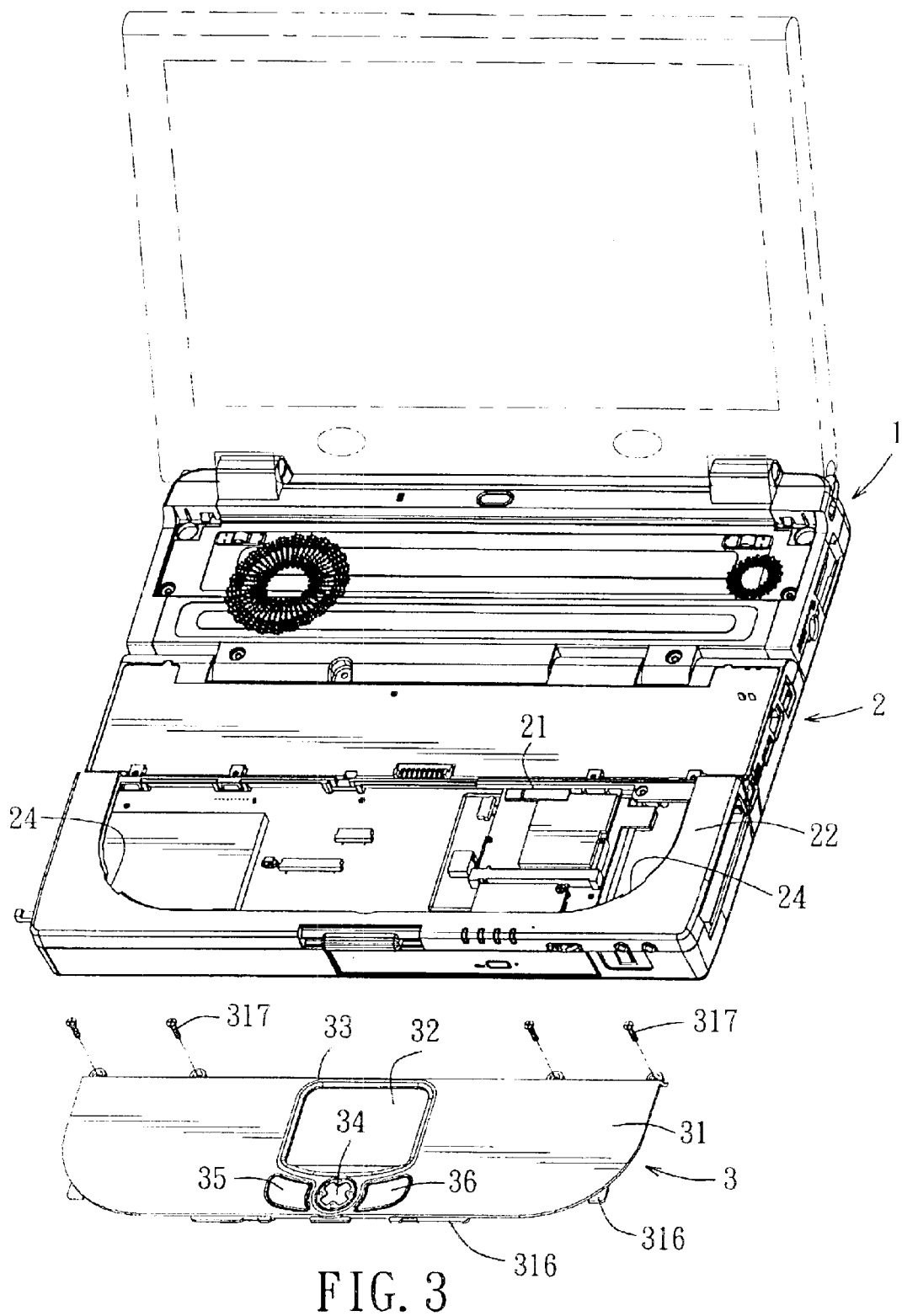
FIG. 3 is a partly exploded perspective view of the preferred embodiment.

As shown in FIGS. 2 and 3, the preferred embodiment of an electronic apparatus 1 according to the present invention is shown to include a host module 2 and a touch control module 3. In this embodiment, the electronic apparatus 1 is a notebook computer. In practice, the electronic apparatus 1 should not be limited to a notebook computer. Other electronic apparatus having a host module and a touch control pad, such as a tablet PC, are also deemed to fall within the scope of this invention.

The host module 2 includes a housing 22, a host circuit 21 received in the housing 22, and a keyboard 23 mounted detachably on the housing 22.

The touch control module 3 includes a face panel 31, a touch control pad 32, a decorative frame 33, a directional key cap 34, a left function key cap 35 and a right function key cap 36.

In FIG. 3, the keyboard 23 has been dismounted such that the touch control module 3 can be removed from the housing 22. The housing 22 is formed with locking grooves 24, and the face panel 31 has a first edge formed with locking tabs 316 that are inserted removably into the locking grooves 24. The face panel 31 further has a second edge opposite to the first edge. A set of screw fasteners 317 secures removably the second edge of the face panel 31 to the housing 22. As a result, the touch control module 3 can be easily removed for inspection and repair by maintenance personnel.

In practice, the design in which removal of the touch control module 3 is possible only after dismounting of the keyboard 23 is only one embodiment of this invention. In other embodiments of this invention, the touch control module 3 can be removed from the housing 22 without dismounting the keyboard. Therefore, the aforesaid design should not be deemed to limit the scope of this invention.

Figure 4:
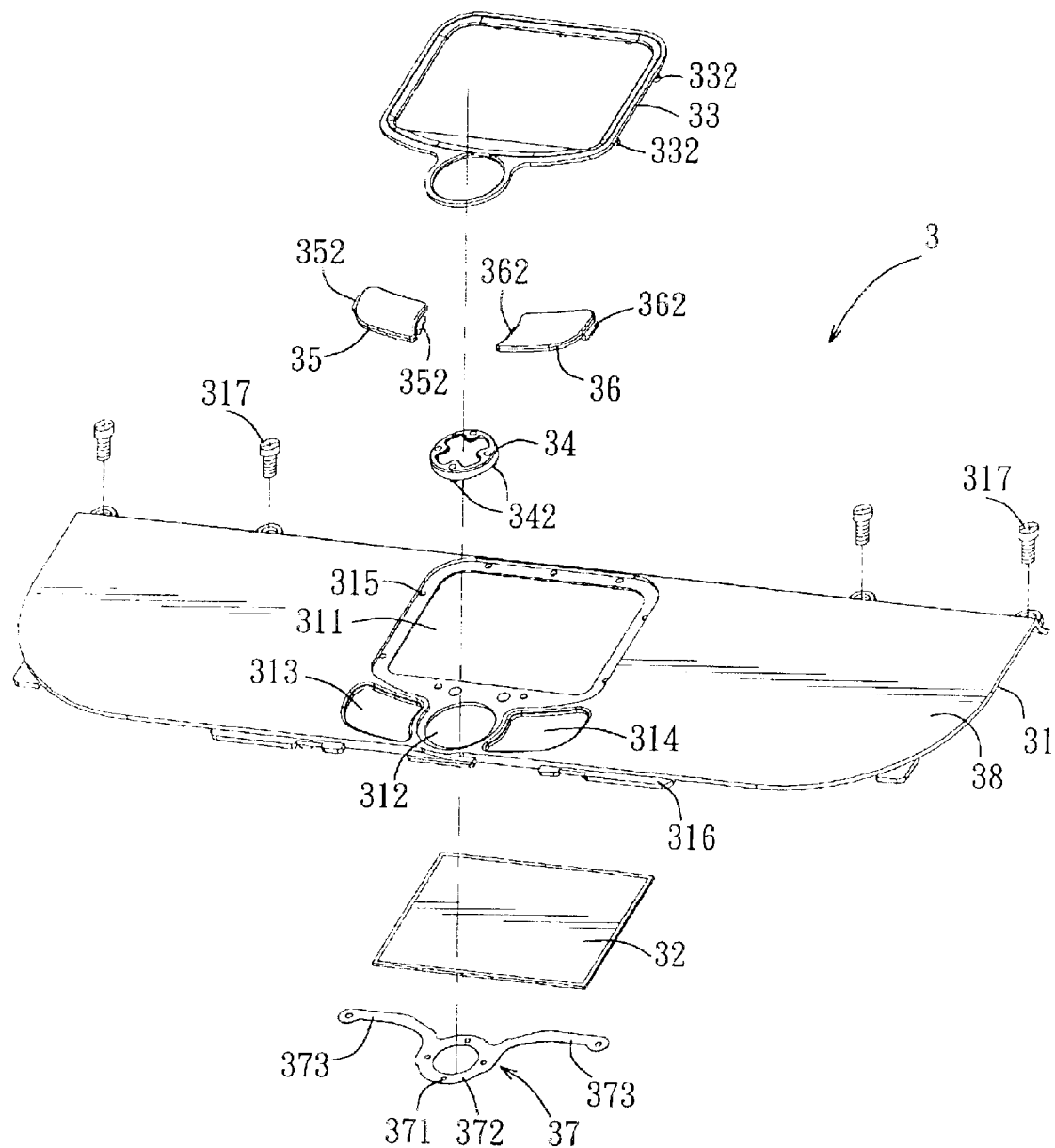
FIG. 4 is an exploded perspective view showing parts of a touch control module of the preferred embodiment.
Figure 5:
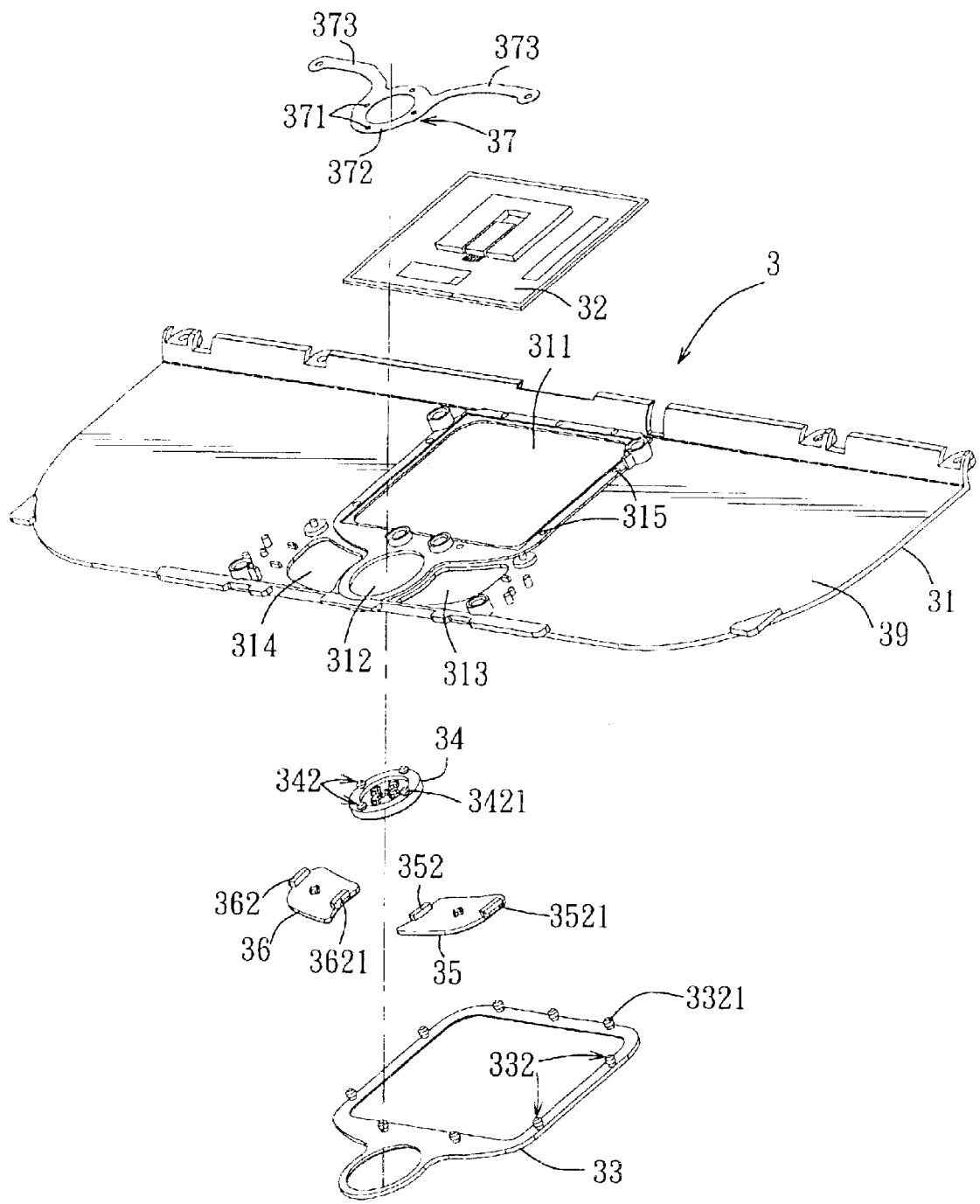
FIG. 5 is an exploded inverted perspective view showing parts of the touch control module of the preferred embodiment.
Figure 6:
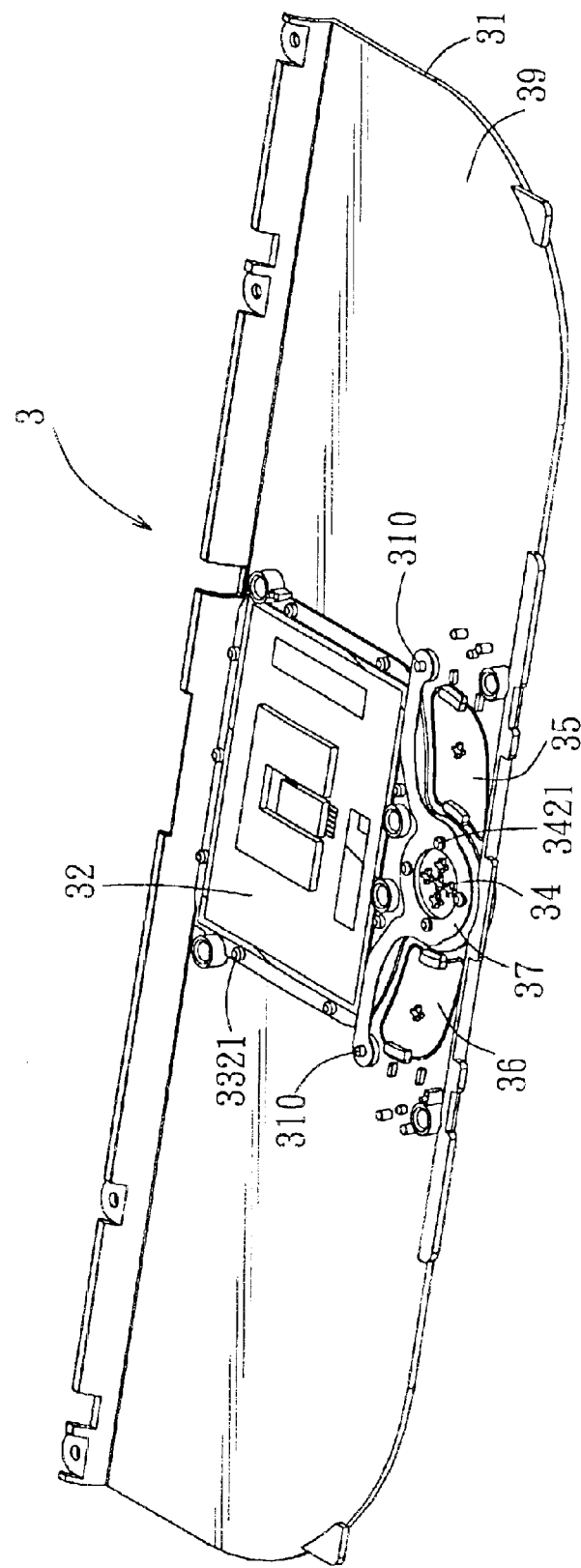
FIG. 6 is an inverted perspective view to illustrate how parts of the touch control module of the preferred embodiment are assembled.

Referring to FIGS. 4, 5 and 6, the face panel 31 has an outer side face 38 (see FIG. 4), an inner side face 39 (see FIG. 5), and a first aperture 311 formed through the outer and inner side faces 38, 39. The touch control pad 32 is a known device suitable for cursor control, is mounted removably on the inner side face 39, and is accessible through the first aperture 311. As to how the touch control pad 32 is coupled electrically and separably to the host circuit 21 (see FIG. 3) will be described in greater detail in the succeeding paragraphs.

The decorative frame 33 is mounted removably on the outer side face 38 of the face panel 31, and is disposed at a periphery of the first aperture 311. The face panel 31 is formed with a set of locking holes 315 (a total of nine in this embodiment) in the periphery of the first aperture 311. The decorative frame 32 is formed with a set of locking members 332 for engaging removably the locking holes 315. In this embodiment, each of the locking members 332 is formed as a headed stub made of a resilient material. The headed stub is extendible through the respective one of the locking holes 315, and has a head end portion 3321 that abuts against the inner side face 39 of the face panel 31 to retain removably the decorative frame 33 on the face panel 31.

The face panel 31 is further formed with a second aperture 312. The directional key cap 34 is disposed in the second aperture 312. The touch control module 3 further includes a positioning member 37 mounted removably on the inner side face 39 of the face panel 31. The positioning member 37 has a loop portion 372 that is registered with the second aperture 312, and a pair of arm portions 373 that extend from the loop portion 372 and that are retained removably on the inner side face 39 of the face panel 31, such as by engagement with retaining pins 310 on the inner side face 39. The loop portion 372 is formed with a set of locking holes 371 (a total of four in this embodiment). The directional key cap 34 is formed with a set of locking members 342 for engaging removably the locking holes 371 such that the directional key cap 34 is mounted removably on the loop portion 372 of the positioning member 37. In this embodiment, each of the locking members 342 has a configuration similar to that of the locking members 332 on the decorative frame 33, and is formed as a headed stub made of a resilient material. The headed stub is extendible through the respective one of the locking holes 371, and has a head end portion 3421 that abuts against the loop portion 372 to retain removably the directional key cap 34 on the positioning member 37.

The face panel 31 is further formed with a pair of third apertures 313, 314. Each of the left and right function key caps 35, 36 is movably disposed in a respective one of the third apertures 313, 314, and has a periphery formed with a pair of resilient hook members 352, 362. Each of the resilient hook members 352, 362 has a hook end 3521, 3621 for abutting against the inner side face 39 of the face panel 31 at a periphery of the respective one of the third apertures 313, 314.

Figure 7:
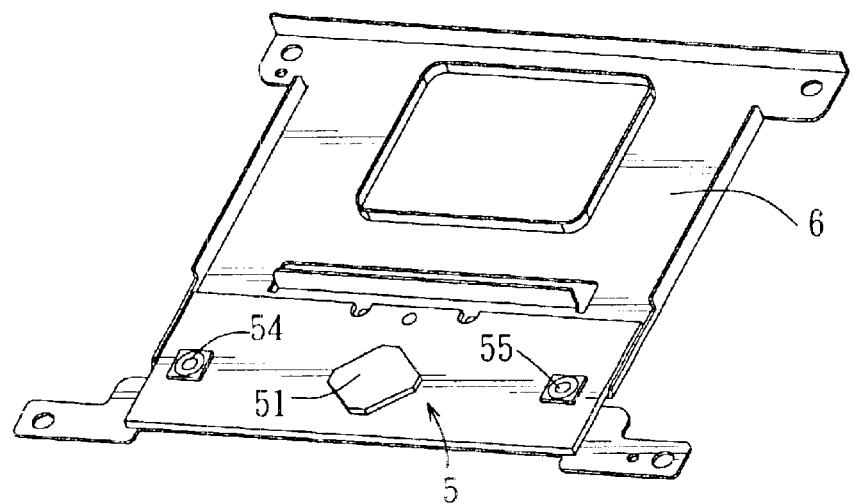
FIG. 7 is a perspective view showing a circuit board and a back plate of the touch control module of the preferred embodiment.
Figure 8:
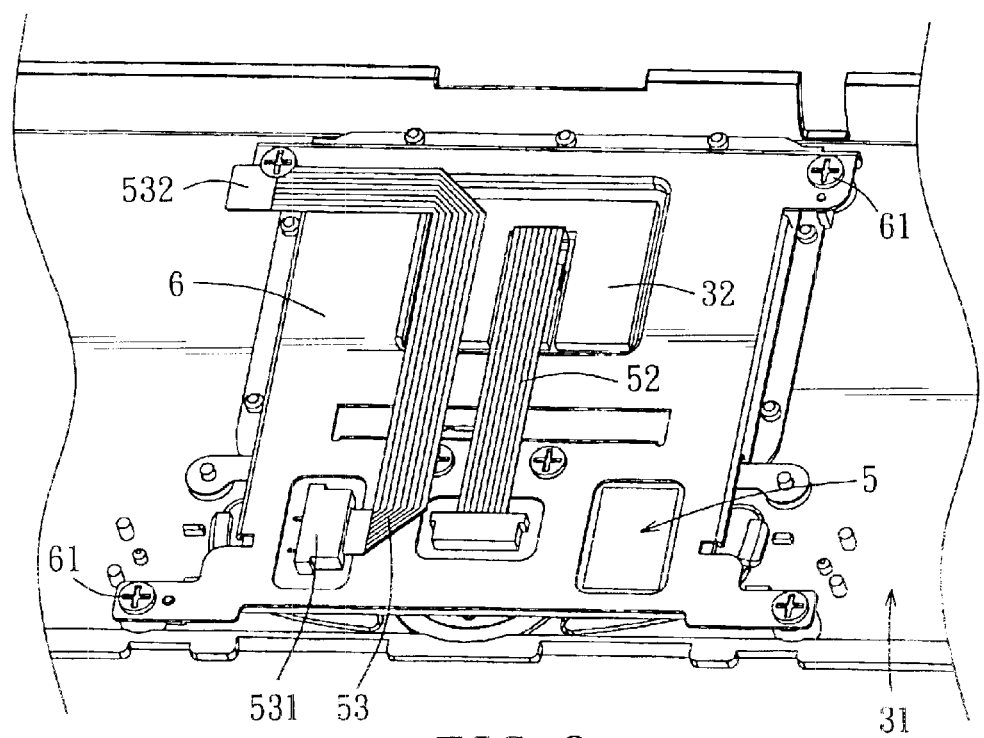
FIG. 8 is a fragmentary assembled inverted perspective view of the touch control module of the preferred embodiment.

With additional reference to FIGS. 7 and 8, the touch control module 3 further includes a circuit board 5 disposed on the inner side face 39 of the face panel 31, and a conventional direction sensor 51 mounted on the circuit board 5 and aligned with the second aperture 312. Accordingly, the direction sensor 51 is configured to generate electrical signals in response to pressure applied on the directional key cap 34. The touch control module 3 further includes first and second switch units 54, 55 mounted on the circuit board 5 and aligned with the third apertures 313, respectively. Each of the switch units 54, 55 is configured to generate a switch signal in a conventional manner in response to pressure applied on the respective one of the function key caps 35, 36.

The touch control module 3 further includes a first signal cable 52 having opposite ends connected electrically to the touch control pad 32 and the circuit board 5, and a second signal cable 53 having a first end 531 connected to the circuit board 5 and a second end 532 connected electrically and removably to the host circuit 21 (see FIG. 3), thereby establishing electrical connection between the touch control module 3 and the host circuit 21.

The touch control module 3 further includes a back plate 6 mounted removably on the inner side face 39 of the face panel 31 with the use of screw fasteners 61 to clamp the circuit board 5 and the touch control pad 32 against the inner side face 39 of the face panel 31, thereby retaining removably the circuit board 5 and the touch control pad 32 on the face panel 31.

Since the touch control module 3 can be easily removed and replaced by maintenance personnel, the electronic apparatus 1 of this invention can thus reduce maintenance costs. Moreover, since replacement of the decorative frame 33, the directional key cap 34, the left function key cap 35 and the right function key cap 36 of the touch control module 3 can be conducted by consumers, the demand for an electronic apparatus with a personalized appearance can be easily met. Replacement of the face panel 31 is also possible, but requires the assistance of the manufacturer of the electronic apparatus 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electronic apparatus comprising:
    a host module including a housing and a host circuit received in said housing: and
    a touch control module including
        a face panel mounted removably on said housing and having an outer side face, an inner side face, and a first aperture formed through said outer and inner side faces, and
        a touch control pad for cursor control, said touch control pad being mounted on said inner side face, being accessible through said first aperture, and being coupled electrically and separably to said host circuit:
    said housing is formed with a locking groove, and said face panel has a first edge formed with a locking tab that is inserted removably into said locking groove; and
    said face panel further has a second edge, said electronic apparatus further comprising screw fasteners for securing removably said second edge of said face panel to said housing.

2. An electronic apparatus comprising:
    a host module including a housing and a host circuit received in said housing; and
    a touch control module including
        a face panel mounted removably on said housing and having an outer side face, an inner side face, and a first aperture formed through said outer and inner side faces, and
        a touch control pad for cursor control, said touch control pad being mounted on said inner side face, being accessible through said first aperture, and being coupled electrically and separably to said host circuit; and
    said touch control module further includes a decorative frame mounted removably on said outer side face of said face panel and disposed at a periphery of said first aperture.

3. The electronic apparatus as claimed in claim 2, wherein said face panel is formed with a set of locking holes in said periphery of said first aperture, said decorative frame being formed with a set of locking members for engaging removably said locking holes.

4. The electronic apparatus as claimed in claim 3, wherein each of said locking members is formed as a headed stub made of a resilient material, said headed stub being extendible through the respective one of said locking holes and having a head end portion that abuts against said inner side face of said face panel to retain removably said decorative frame on said face panel.

5. An electronic apparatus comprising:
- a host module including a housing and a host circuit received in said housing; and
- a touch control module including
  - a face panel mounted removably on said housing and having an outer side face, an inner side face, and a first aperture formed through said outer and inner side faces, and
  - a touch control pad for cursor control, said touch control pad being mounted on said inner side face, being accessible through said first aperture, and being coupled electrically and separably to said host circuit; and
- said face panel is formed with a second aperture, said touch control module further including a directional key cap disposed in said second aperture.

6. The electronic apparatus as claimed in claim 5, wherein said touch control module further includes a positioning member mounted removably on said inner side face of said face panel, said positioning member having a loop portion that is registered with said second aperture, and a pair of arm portions that extend from said loop portion and that are retained removably on said inner side face of said face panel, said directional key cap being mounted removably on said loop portion of said positioning member.

7. The electronic apparatus as claimed in claim 6, wherein said loop portion is formed with a set of locking holes, said directional key cap being formed with a set of locking members for engaging removably said locking holes.

8. The electronic apparatus as claimed in claim 7, wherein each of said locking members is formed as a headed stub made of a resilient material, said headed stub being extendible through the respective one of said locking holes and having a head end portion that abuts against said loop portion to retain removably said directional key cap on said positioning member.

9. The electronic apparatus as claimed in claim 5, wherein said touch control module further includes a circuit board disposed on said inner side face of said face panel, and a direction sensor mounted on said circuit board and aligned with said second aperture, said direction sensor being configured to generate electrical signals in accordance with pressure applied on said directional key cap.

10. The electronic apparatus as claimed in claim 9, wherein said touch control module further includes a first signal cable having opposite ends connected electrically to said touch control pad and said circuit board, and a second signal cable having a first end connected to said circuit board and a second end connected electrically and removably to said host circuit, thereby establishing electrical connection between said touch control module and said host circuit.

11. The electronic apparatus as claimed in claim 9, wherein said touch control module further includes a back plate mounted removably on said inner side face of said face panel to retain removably said circuit board and said touch control pad on said inner side face of said face panel.

12. An electronic apparatus comprising:
- a host module including a housing and a host circuit received in said housing; and
- a touch control module including
  - a face panel mounted removably on said housing and having an outer side face, an inner side face, and a first aperture formed through said outer and inner side faces, and
  - a touch control pad for cursor control, said touch control pad being mounted on said inner side face, being accessible through said first aperture, and being coupled electrically and separably to said host circuit;
- said face panel is formed with a third aperture, said touch control module further including a function key cap movably disposed in said third aperture;
- said touch control module further includes a circuit board disposed on said inner side face of said face panel and a switch unit mounted on said circuit board and aligned with said third aperture, said switch unit being configured to generate a switch signal in accordance with pressure applied on said function key cap; and
- said touch control module further includes a back plate mounted removably on said inner side face of said face panel to retain removably said circuit board and said touch control pad on said inner side face of said face panel.

* * * * *